US009241353B2

(12) United States Patent
Do et al.

(10) Patent No.: US 9,241,353 B2
(45) Date of Patent: Jan. 19, 2016

(54) COMMUNICATIONS BETWEEN A MOBILE DEVICE AND AN ACCESS POINT DEVICE

(71) Applicant: QUALCOMM Incorporated, San Diego, CA (US)

(72) Inventors: Ju-Yong Do, Palo Alto, CA (US); Sai Pradeep Venkatraman, Santa Clara, CA (US); Weihua Gao, San Jose, CA (US); Amir A. Emadzadeh, Campbell, CA (US); Sundar Raman, Fremont, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 13/952,396

(22) Filed: Jul. 26, 2013

(65) Prior Publication Data

US 2015/0029945 A1 Jan. 29, 2015

(51) Int. Cl.

| | |
|---|---|
| ***H04W 4/00*** | (2009.01) |
| ***H04W 76/02*** | (2009.01) |
| ***G01S 5/02*** | (2010.01) |
| ***H04W 48/12*** | (2009.01) |
| *H04W 64/00* | (2009.01) |
| *H04W 88/10* | (2009.01) |

(52) U.S. Cl.

CPC ............... *H04W 76/02* (2013.01); *G01S 5/021* (2013.01); *G01S 5/0263* (2013.01); *H04W 48/12* (2013.01); *H04W 64/00* (2013.01); *H04W 88/10* (2013.01)

(58) Field of Classification Search

USPC .................................. 370/236, 252, 328, 331

See application file for complete search history.

(56) References Cited

U.S. PATENT DOCUMENTS

| | | | | |
|---|---|---|---|---|
| 6,259,898 | B1 | 7/2001 | Lewis | |
| 6,950,655 | B2 * | 9/2005 | Hunkeler | 455/426.1 |
| 8,314,736 | B2 | 11/2012 | Moshfeghi | |
| 2003/0193895 | A1 | 10/2003 | Engwer et al. | |
| 2007/0242643 | A1 | 10/2007 | Chandra et al. | |
| 2007/0247366 | A1 | 10/2007 | Smith et al. | |
| 2007/0274275 | A1 * | 11/2007 | Laroia et al. | 370/338 |
| 2008/0186231 | A1 | 8/2008 | Aljadeff et al. | |
| 2010/0135178 | A1 | 6/2010 | Aggarwal et al. | |
| 2010/0279689 | A1 * | 11/2010 | Tinnakornsrisuphap et al. | 455/435.2 |

(Continued)

FOREIGN PATENT DOCUMENTS

WO 2010059934 A2 5/2010

OTHER PUBLICATIONS

International Search Report and Written Opinion—PCT/US2014/045454—ISA/EPO—Nov. 5, 2014.

*Primary Examiner* — Kwang B Yao
*Assistant Examiner* — Nguyen Ngo
(74) *Attorney, Agent, or Firm* — Silicon Valley Patent Group LLP

(57) ABSTRACT

Method, device, and computer program product that may improve communications between a mobile device and an access point device are disclosed. In one embodiment, a method of communicating between a mobile device and an access point device comprises control a plurality of beacons in the access point device, establishing a communication between the access point device with the mobile device using a first beacon in the plurality of beacons, broadcasting availability of the plurality of beacons in the access point device via the first beacon, and establishing the communication with the mobile device using a second beacon in the plurality of beacons.

29 Claims, 7 Drawing Sheets

(56) References Cited

U.S. PATENT DOCUMENTS

| | | | | |
|---|---|---|---|---|
| 2010/0311437 | A1* | 12/2010 | Palanki et al. | 455/456.1 |
| 2012/0270573 | A1 | 10/2012 | Marti et al. | |
| 2013/0012201 | A1* | 1/2013 | Zappulla | 455/432.3 |
| 2013/0115971 | A1* | 5/2013 | Marti et al. | 455/456.1 |
| 2014/0133294 | A1* | 5/2014 | Horn et al. | 370/230 |
| 2014/0204903 | A1* | 7/2014 | Kim et al. | 370/331 |
| 2014/0287753 | A1* | 9/2014 | Schulist et al. | 455/436 |
| 2014/0289140 | A1* | 9/2014 | Vijayant | 705/319 |
| 2014/0372024 | A1* | 12/2014 | Lee | 701/446 |

* cited by examiner

COMMUNICATIONS BETWEEN A MOBILE DEVICE AND AN ACCESS POINT DEVICE

FIELD

The present disclosure relates to the field of wireless communications. In particular, the present disclosure relates to communications between a mobile device and an access point device.

BACKGROUND

In conventional applications, various beacons, such as WiFi, Bluetooth, femtocell, QR code, near field communication (NFC) device, may be employed for indoor positioning separately. However, in these conventional applications, the joint usage of such beacons for positioning applications has not been achieved due to difficulty of gathering heterogeneous beacon information. The difficulty of joint usage stems from the way these beacons were previously deployed. For example, WiFi access points (APs) may be handled by information technology department while QR codes may be handled by marketing department. Thus, the information of heterogeneous beacons can be scattered and not being placed together, causing indoor positioning with multi-type beacons infeasible. Another issue with the conventional individualized beacon deployment is that calibration of positioning sensors is done separately due to absence of a common node of calibration.

Therefore, there is a need for method, device, and computer program product that may improve communications between a mobile device and an access point device.

SUMMARY

The present disclosure relates to communications between a mobile device and an access point device. In one embodiment, a method of communicating between a mobile device and an access point device comprises controlling a plurality of beacons in the access point device, establishing a communication between the access point device with the mobile device using a first beacon in the plurality of beacons, broadcasting availability of the plurality of beacons in the access point device via the first beacon, and establishing the communication with the mobile device using a second beacon in the plurality of beacons.

In another embodiment, an access point device comprises at least one processor, where the at least one processor comprises logic configured to control a plurality of beacons in the access point device, logic configured to establish a communication between the access point device with a mobile device using a first beacon in the plurality of beacons, logic configured to broadcast availability of the plurality of beacons in the access point device via the first beacon, and logic configured to establish the communication with the mobile device using a second beacon in the plurality of beacons.

In yet another embodiment, a computer program product comprising a non-transitory medium storing computer programs for execution by one or more processors; the computer program product comprises code for controlling a plurality of beacons in an access point device, code for establishing a communication between the access point device with a mobile device using a first beacon in the plurality of beacons, code for broadcasting availability of the plurality of beacons in the access point device via the first beacon, and code for establishing the communication with the mobile device using a second beacon in the plurality of beacons.

In yet another embodiment, an access point device comprises means for controlling a plurality of beacons in the access point device, means for establishing a communication between the access point device with the mobile device using a first beacon in the plurality of beacons, means for broadcasting availability of the plurality of beacons in the access point device via the first beacon, and means for establishing the communication with the mobile device using a second beacon in the plurality of beacons.

In yet another embodiment, a mobile device comprises at least one processor, where the at least one processor comprises logic configured to controlling a plurality of beacons in the mobile device, logic configured to establish a communication between an access point device with the mobile device using a first beacon in the plurality of beacons, logic configured to receive a broadcast availability of a set of beacons in the access point device via the first beacon, and logic configured to establish the communication with the access point device using a second beacon in the plurality of beacons.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of method, device, computer program product for communications between a mobile device and an access point device are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word “exemplary” or “example” is used herein to mean “serving as an example, instance, or illustration.” Any aspect or embodiment described herein as "exemplary" or as an "example" in not necessarily to be construed as preferred or advantageous over other aspects or embodiments.

Figure 1:
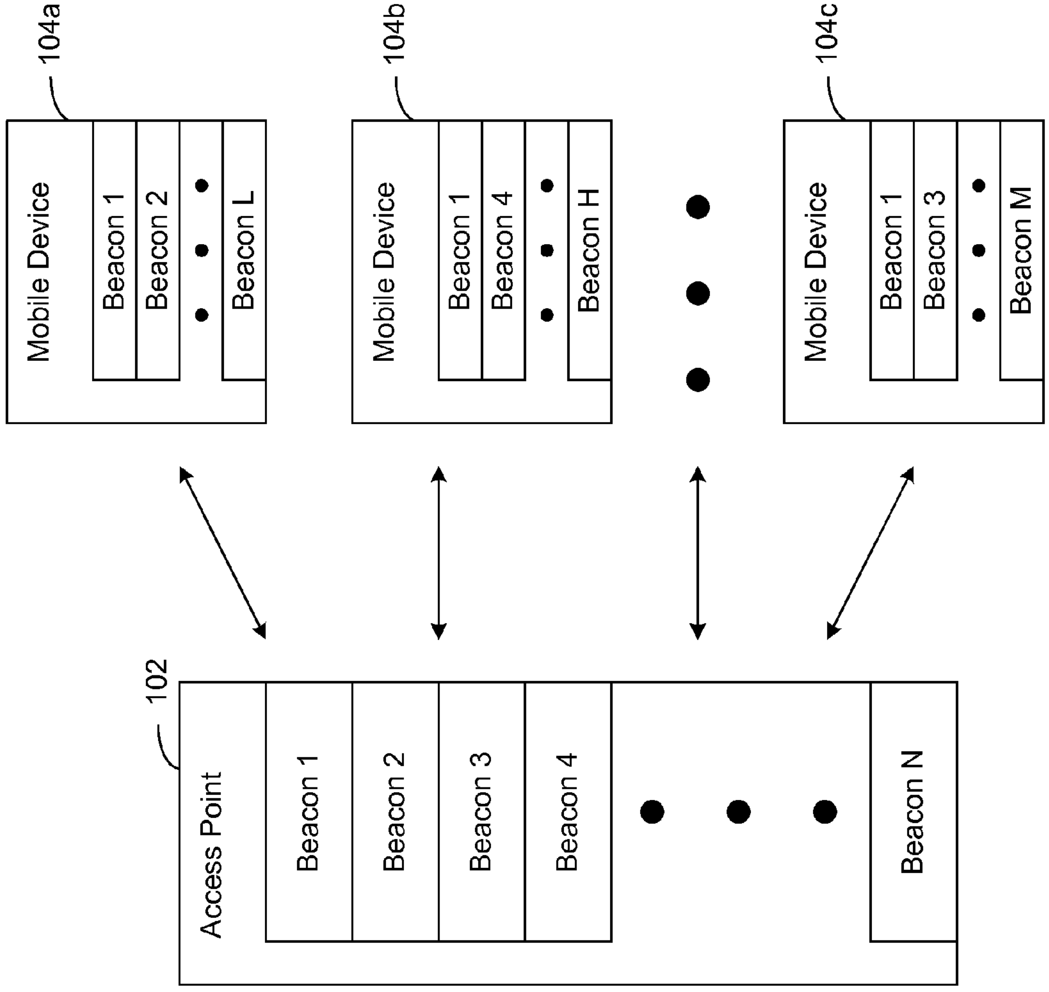
FIG. 1 illustrates exemplary communications between an access point device and one or more mobile devices according to aspects of the present disclosure.

FIG. 1 illustrates exemplary communications between an access point device and one or more mobile devices according to aspects of the present disclosure. In the example of FIG. 1, access point device 102 may include multiple beacons, namely beacons 1 through N. Each of the multiple beacons may support the functionalities of, including but not limited to WiFi, Bluetooth, cellular, NFC, QR code (placed on the surface of the access point device), and femtocell.

Access point device 102 may communicate with one or more mobile devices, shown as 104*a*, 104*b*, and 104*c*. According to aspects of the present disclosure, each mobile device may include a plurality of beacons. For example, mobile device 104*a* may include beacons 1 through L; mobile device 104*b* may include beacons 1 through H; and mobile device 104*c* may include beacons 1 through M. Similar to the multiple beacons supported by the access point device 102, each beacon in a mobile device (104*a* to 104*c*) may support the functionalities of, including but not limited to WiFi, Bluetooth, cellular, NFC device, QR code, and femtocell.

Access point device 102 may be configured to mirror the combination of functionalities of the mobile devices. When both the access point device 102 and the mobile device (e.g. 104*a*) share a set of common beacons, both devices may be configured to take advantage of communication capabilities through the set of common beacons for indoor positioning and navigation.

According to aspects of the present disclosure, an access point device 102 may be configured to serve a particular geographic area and can be deployed at various locations such as homes, offices, shops, apartments, etc. An access point device may also be referred to as a home base station. The home base stations can be configured to improve radio coverage, increase throughput, reduce load on a macro-cellular network, and/or provide other benefits for network operators and/or users. Unlike macro base stations that are carefully deployed at specific known locations and maintained by network operators, home base stations may be flexibly deployed in an unplanned manner at any location by users but typically use licensed radio frequencies of the network operators.

An access point device 102 may support communications for one or more mobile devices within its coverage. It may be desirable to know the location of the access point device and/or the mobile device communicating with the access point device. For example, it may be desirable to know the location of the access point device in order to ensure that it is authorized to operate at its current location (e.g., is within a geographic area for which an associated network operator has a license to use the radio frequencies supported by the access point device). As another example, the user of a mobile device may place an emergency call using the access point device. The location of the mobile device may then be approximated by the location of the access point device and used to send emergency assistance to the user. There are many other scenarios in which knowledge of the location of an access point device may be useful or necessary.

According to aspects of the present disclosure, access point device 102 and the mobile device (e.g. 104*a*) may be configured to support hybrid indoor positioning procedure using multiple types of beacons. In one exemplary implementation, the access point device 102 may be configured to broadcast its functionality information to the multiple mobile devices, indicating the types of beacons may be supported by the access point device 102, such as WiFi, BT, NFC, QR code, CDMA, GSM, WCDMA, LTE, and etc. The broadcast can be performed through all beacon types (i.e. through WiFi, BT, QR code, etc.). Alternatively, a mobile device may access a server (not shown) to download a prepackaged assistance data for all neighboring beacons.

A mobile device may be configured to enable a set of sensors to discover beacons and collect measurements. For example, if a camera is on, a QR code on the surface of the access point device 102 may be discovered. Alternatively, if only cellular is on, a modem may detect a femtocell may be nearby. The mobile device (e.g. 104*a*) may combine measurements from the multiple beacons and use such measurements for indoor positioning. For example, the mobile device may be configured to use WiFi RSSI/RTT and BT RSSI/RTT measurements from a first beacon, QR code measurements from a second beacon, and WiFi RSSI and cellular measurements from a third beacon for indoor positioning. According to aspects of the present disclosure, proper weighting and measurement-to-range conversion formula may be applied in accordance with the different natures of each beacon type. Examples of natures of the beacon types may include but not limited to: 1) QR code or NFC may have short range but high accuracy; 2) WiFi or Bluetooth may have mid-range and medium accuracy; and 3) cellular may have long-range but low accuracy.

Figure 2:
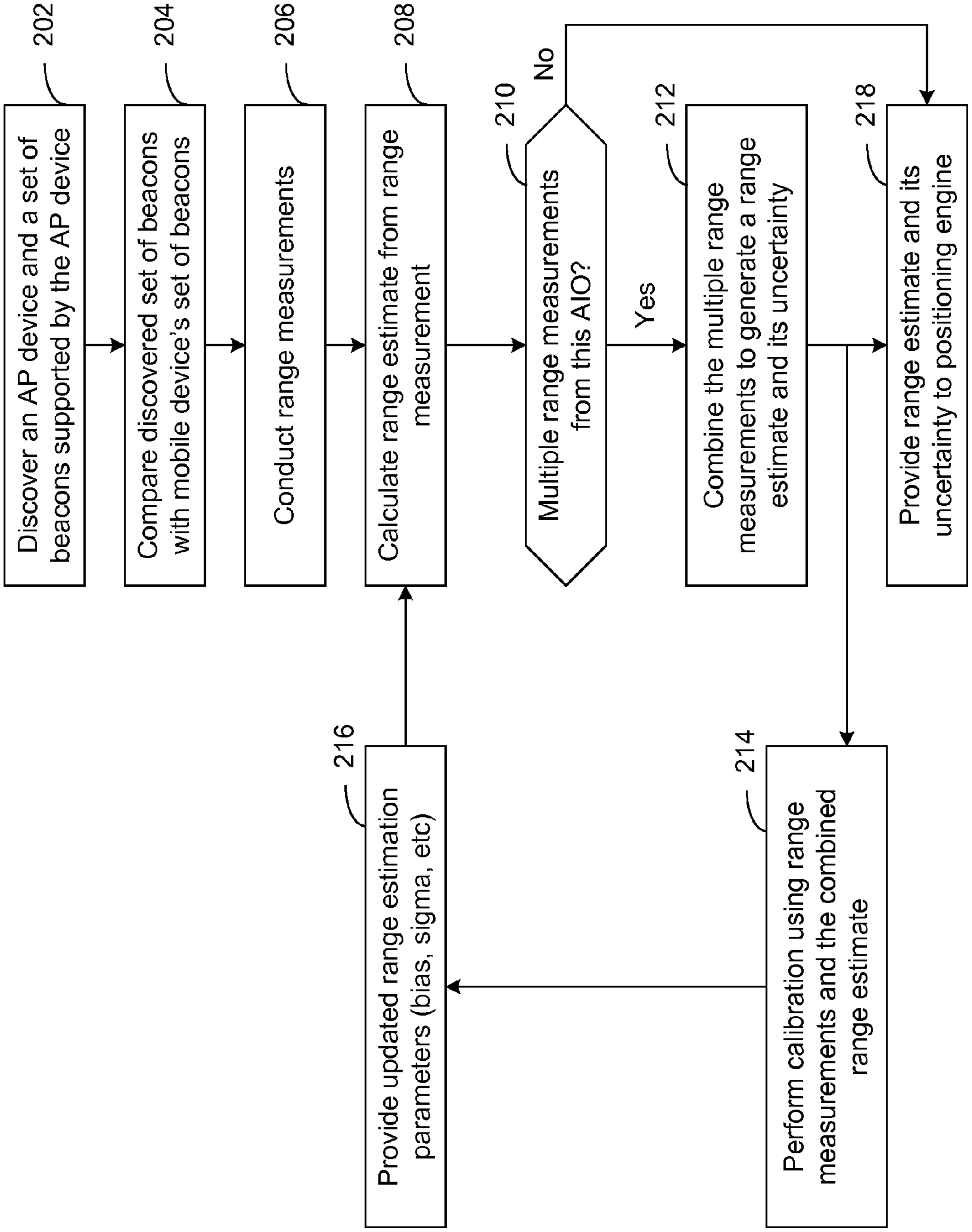
FIG. 2 illustrates an exemplary range measurement procedure performed by a mobile device according to aspects of the present disclosure.

FIG. 2 illustrates an exemplary range measurement procedure performed by a mobile device according to aspects of the present disclosure. In the exemplary implementation shown in FIG. 2, in block 202, a mobile device (for example 104*a*) may be configured to discover an access point device 102 and a set of beacons the access point device 102 may support. In block 204, the mobile device 104*a* may be configured to compare the discovered set of beacons supported by the access point device 102 (for example 1 through N as shown in FIG. 1) with a set of beacons supported by the mobile device 104*a* (for example 1 through L as shown in FIG. 1). The comparison may identify a set of common beacons that are supported by both the mobile device 104*a* and the access point device 102.

In block 206, the mobile device 104*a* may be configured to conduct range measurements between the mobile device 104*a* and the access point device 102, using the set of common beacons identified in block 204. In block 208, the mobile device 104*a* may be configured to calculate a range estimate from the range measurements made. In block 210, a determination is made to determine whether there are multiple range measurements made from the access point device 102. If there are multiple range measures made from the access point device 102 (210_Yes), the procedure moves to block 212. Alternatively, if no multiple range measurements made from the access point device 102 (210_No), the procedure moves to block 218.

In block 212, the mobile device 104*a* may be configured to combine the multiple range measurements to generate a combined range estimate and its corresponding uncertainty. According to aspects of the present disclosure, the range measurement procedure may be performed iteratively to refine the range estimate generated in block 212, or may be terminated if a desired range estimate has been obtained. In the event it is desirable to refine the range estimate generated in block 212, the procedure moves to block 214. Alternatively, in the event a desired range estimate has been obtained, the procedure moves to block 218.

In block 214, the mobile device 104*a* may be configured to perform calibration using range measurements obtained in block 206 and the combined range estimate generated in block 212. In block 216, the mobile device 104*a* may be configured to provide updated range estimation parameters to block 208 for calculating the range estimate from the range measurements made in block 206. In block 218, the mobile device 104*a* may be configured to provide the range estimate generated in block 212 and its corresponding uncertainty to a positioning engine. The procedure may terminate after block 218.

According to aspects of the present disclosure, a method of correcting a range estimate may be described in the following pseudo codes.

```
d(i) = d_raw(i) - d0(i);
where d_raw(i) = an uncorrected raw range estimate from an i^th beacon
d(i) = a corrected range estimate from an i^th beacon after compensation
of known biases.
d0(i) = an estimated bias in a range estimate from an i^th beacon.
```

According to aspects of the present disclosure, a method of combining range estimates may be described in the following pseudo codes.

```
d_comb = sum( d(i) * w(i) )/M
where d_comb = combined range estimate from this access point.
M = the number of range estimates to be combined
w(i) = a normalized weighting value for range estimates from an i^th
beacon
    = w_raw(i)/sum(w_raw(j))
w_raw(i) = a raw weighting value for range estimates from an i^th beacon
    = 0 if sigma(i) > sigmaTh
    = 1/sigma(i)^2 if sigma(i) <= sigmaTh
sigmaTh could be the minimum accuracy for range combination (e.g. 20
m) to avoid outliers from range combination.
```

Note that if insufficient number of range estimates for combination (e.g., 2 or 3) or deviation among range estimate may be too large (measured by spread=sqrt(sum((d(i)−d_comb)^2)/M)>spreadTh. For example, d(1)=100 m, d(2)=200 m, d(3)=600 m, spread=216>spreadTh=100), the range estimate w. the lowest sigma can be used as d_comb.

Figure 3:
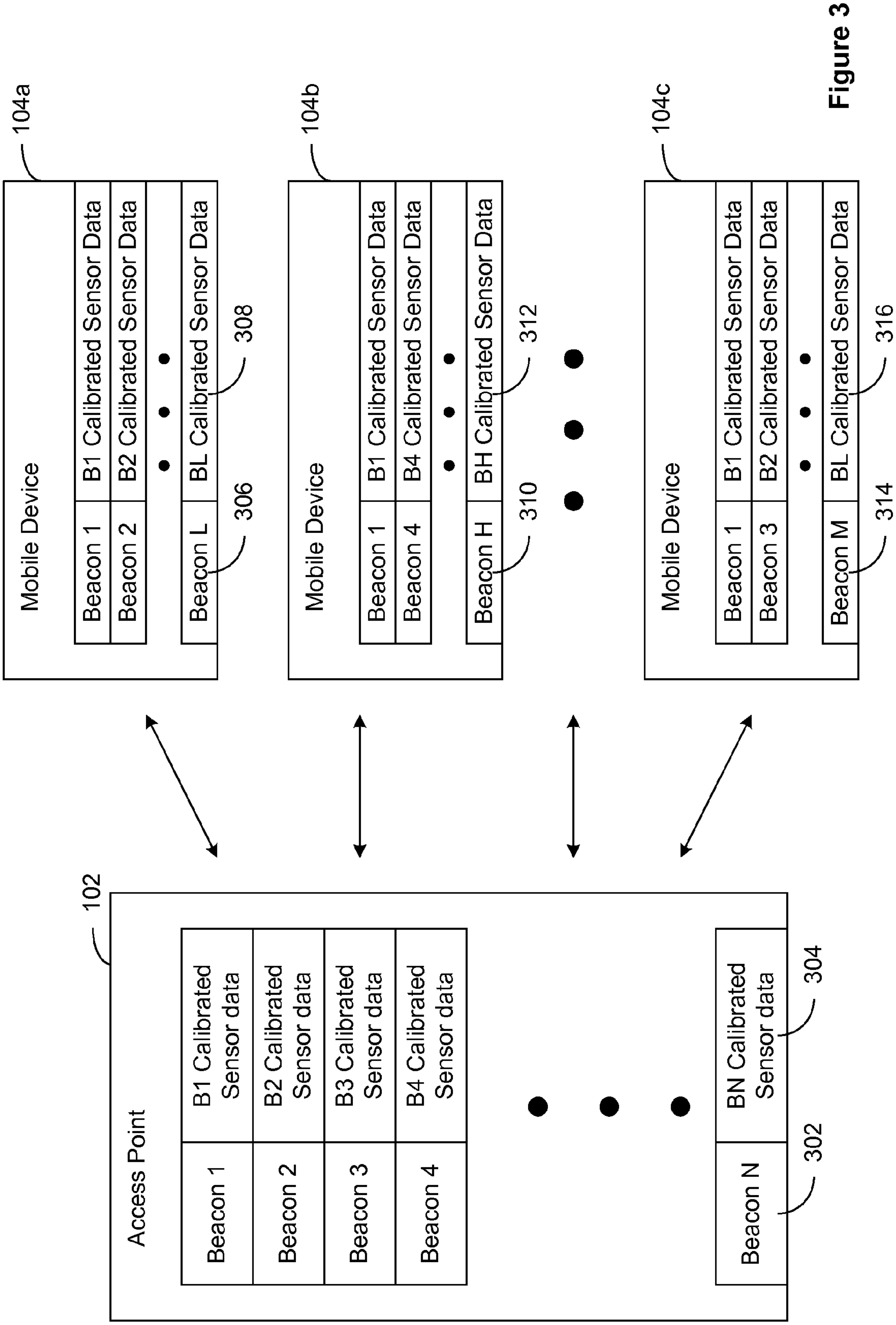
FIG. 3 illustrates an exemplary environment for performing dynamic calibration between the access point device and the one or more mobile devices according to aspects of the present disclosure.

FIG. 3 illustrates an exemplary environment for performing dynamic calibration between the access point device and the one or more mobile devices according to aspects of the present disclosure. Note that the same access point device 102 and one or more mobile devices 104*a*, 104*b*, and 104*c* shown in FIG. 1 are repeated in FIG. 3. For simplicity of description, new features will be described in association with FIG. 3, and the features described in FIG. 1 will not be repeated.

In the example shown in FIG. 3, in access point device 102, each beacon may include its associated calibrated sensor data. For example, beacon N (302) may have its associated calibrated sensor data, referred to as BN calibrated sensor data (304). Similarly, in a mobile device, each beacon may include its associated calibrated sensor data as well. For example, for mobile device 104*a*, beacon L (306) may have its associated calibrated sensor data, referred to as BL calibrated sensor data (308); for mobile device 104*b*, beacon H (310) may have its associated calibrated sensor data, referred to as BH calibrated sensor data (312); and for mobile device 104*c*, beacon M (314) may have its associated calibrated sensor data, referred to as BM calibrated sensor data (316).

According to aspects of the present disclosure, cross-sensor calibration and validation procedure may be performed using the multiple beacons in the access point device 102 as well as in the mobile device (e.g. 104*a*). An exemplary implementation may be performed as follows. First, the access point device 102 may be configured to collect multiple type of beacon measurement from a single beacon. For example, the access point device 102 may be configured to collect WiFi RTT/RSSI, BT RTT/RSSI, NFC, cellular (GSM/WCDMA/LTE/CDMA/WiMax), QR code measurements. Next, the access point device 102 may be configured to apply proper weighting and measurement-to-range conversion in accordance with the different nature of each beacon type and prior accuracy information. If a beacon type is pre-calibrated (e.g. QR code size is known or TCF of WiFi RTT is known), a higher weighting may be applied to that sensor or it may be deemed as accurate. Next, the access point device 102 may be configured to estimate the range to the beacon based on weighted combined measurements since the beacons are located within the same access point device 102. Then, the access point device 102 may be configured to calculate biases of individual sensor's measurement (on a mobile device) against the estimated range. Finally, the access point device 102 may be configured to accumulate and apply the estimated biases for the individual sensor (e.g. WiFi RSSI offset and scale) for future measurement-to-range conversion. The above procedures may be performed bi-directionally between the access point device 102 and a mobile device 104*a*; or the above procedures may be performed may be performed in a one-way manner if one side (access point device or mobile device) has already been calibrated.

Figure 4:
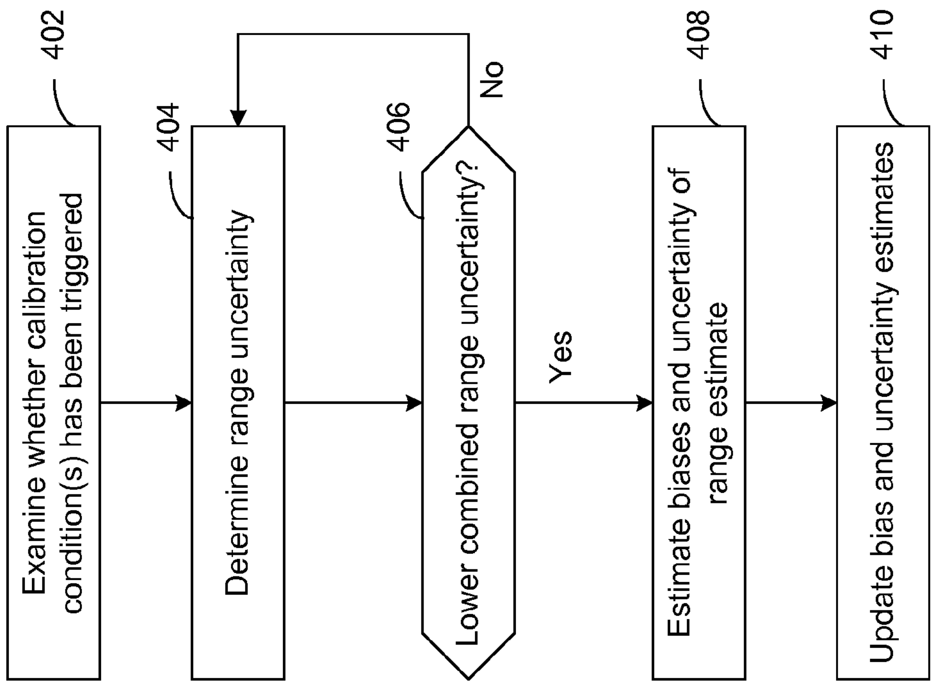
FIG. 4 illustrates a method of calibrating a beacon in a mobile device according to aspects of the present disclosure.

FIG. 4 illustrates a method of calibrating a beacon in a mobile device according to aspects of the present disclosure. In the exemplary implementation shown in FIG. 4, in block 402, a mobile device 104*a* may be configured to examine whether one or more calibration conditions have been triggered. According to aspects of the present disclosure, a calibration condition may be triggered if 1) multiple range measurements are available from access point device; and/or 2) last calibration has been past more than a calibration period threshold. In other implementations, calibration may be performed periodically to compensate for hardware changes over time. In yet other implementations, calibration may be performed at an initial stage when a product is being used for the first time. Procedures performed in blocks 404-410 may be repeated for each beacon in the mobile device 104*a*.

In block 404, the mobile device 104*a* may be configured to determine a range uncertainty by comparing the uncertainty of combined range estimate (denoted as sigma_comb) and uncertainty of a beacon's existing range estimate (denoted as sigma_this_beacon).

In block 406, a determination is made to determine whether the uncertainty of combined range estimate is smaller than the uncertainty of a beacon's existing range estimate. If the uncertainty of combined range estimate is smaller than the uncertainty of a beacon's existing range estimate (406_Yes), the procedure moves to block 408. Alternatively, if the uncertainty of combined range estimate is not smaller than the uncertainty of a beacon's existing range estimate (406_No), the procedure moves back to block 404. In block 408, the mobile device 104*a* may be configured to estimate biases and uncertainty of range estimate of the beacon. In block 410, the mobile device 104*a* may be configured to update bias and uncertainty estimates. The procedure may end after block 410.

According to aspects of the present disclosure, calibration of a beacon may include methods described in the following pseudo codes.

```
d(i) ~ N(d0(i), sigma(i)^2)
where d(i) = a range estimate from an i^th beacon
d0(i) = a bias in a range estimate from an i^th beacon
sigma(i) = a standard deviation (i.e. uncertainty) of a range estimate from
an i^th beacon
```

-continued

| |
|---|
| Then, estimate d0(i) and sigma(i) for each function. |
| First, determine the difference between the d(i) vs. d_comb = combined range estimate from the access point device. |
| Delta = d(i) − d_comb |
| d0(i) = d0(i)_old * (N−1)/N + Delta /N |
| sigma(i) = sqrt(sigma(i)_old^2 * (N−1)/N + Delta^2 /N) |
| where d0(i)_old = previous estimate of d0(i). If no value exists yet, d0(i)_old = 0. |
| sigma(i)_old = previous estimate of sigma(i). If no value exists yet, sigma(i)_old = 50 m (or any known accuracy information e.g. 20 m for WiFi RSSI, 10 m for WiFi RTT, 1 m for NFC, 10 cm for UWB, 1 cm for QR code). |
| N = minimum of the number of previous estimates and maximum number of accumulated estimates = min(N, maxNumAccEst) |

Figure 5:
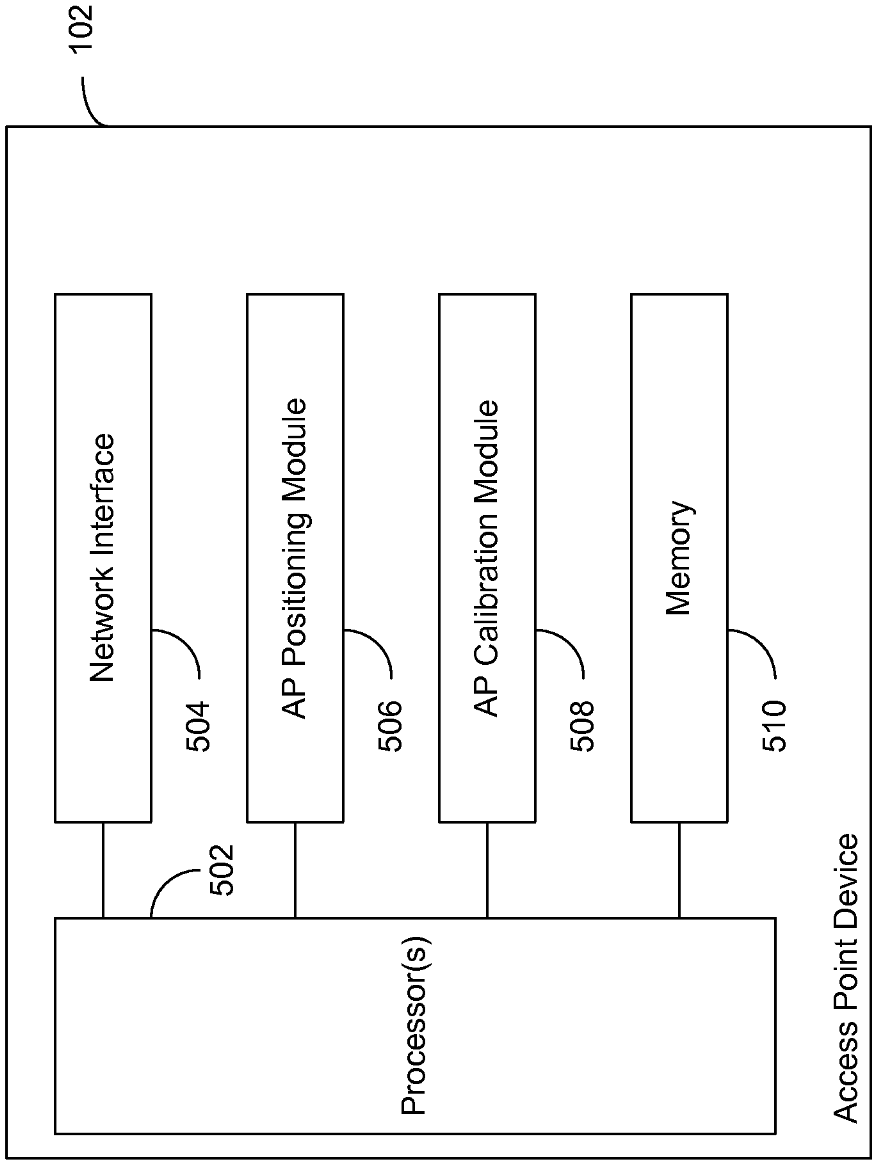
FIG. 5 illustrates an exemplary block diagram of an access point device according to some aspects of the present disclosure.

FIG. 5 illustrates an exemplary block diagram of an access point device according to some aspects of the present disclosure. In the exemplary block diagram shown in FIG. 5, access point device 102 may include one or more processor(s) 502, network interface 504, access point (AP) positioning module 506, AP calibration module 508, and memory 510. The network interface 504 may be configured to enable access point device 102 to wired or wireless networks. The AP positioning module 506 may be configured to assist a mobile device to determine its positions using range measurements obtained from the multiple beacons in the access point device 102. The AP calibration module 508 may be configured to assist a mobile device to perform calibration using calibrated sensor data of the multiple beacons in the access point device 102. The one or more processor(s) 502 can be configured to control/interface with network interface 504, AP positioning module 506, AP calibration module 508, and memory 510 to perform the functions described by each of the blocks.

Figure 6:
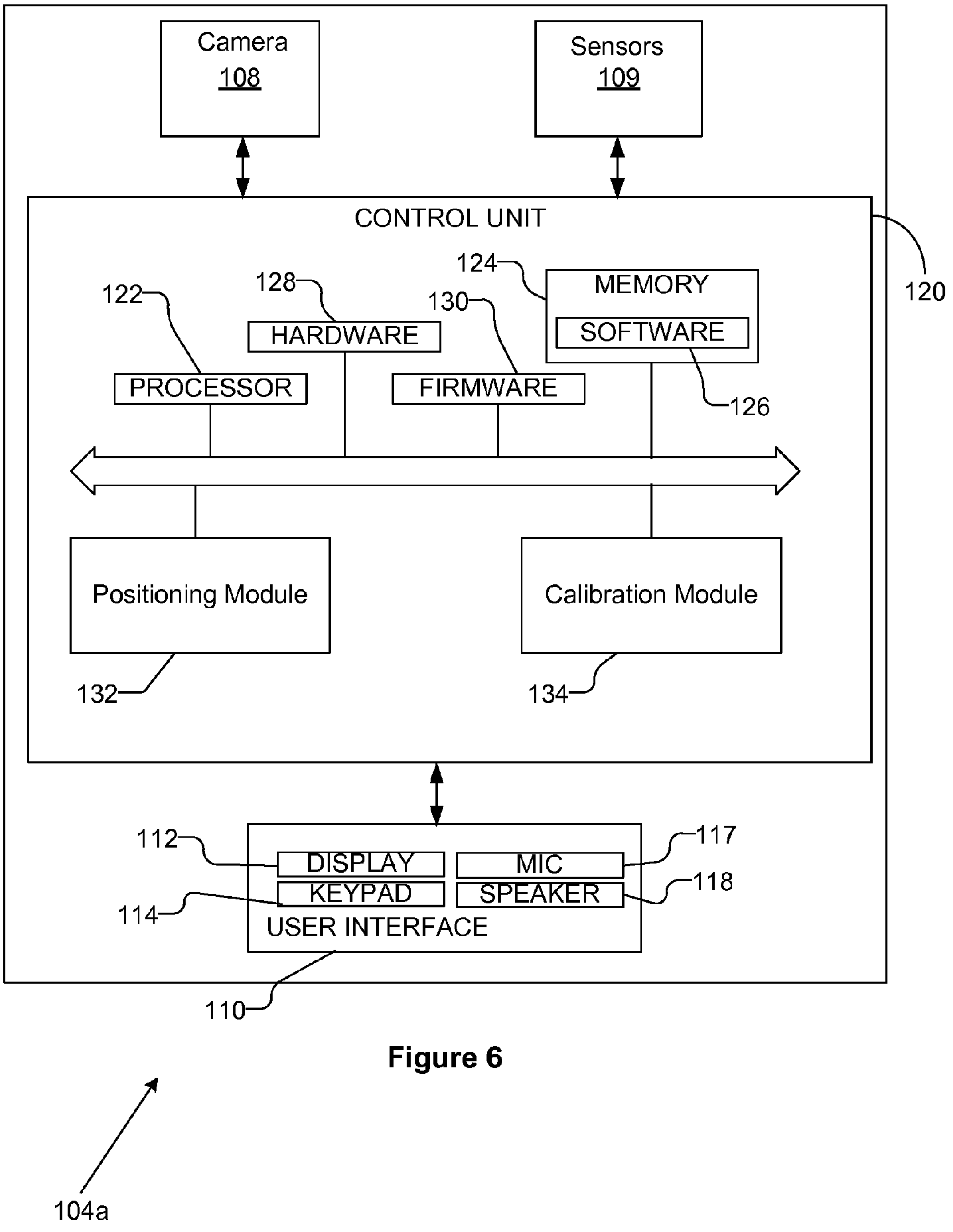
FIG. 6 illustrates an exemplary block diagram of a mobile device according to aspects of the present disclosure.

FIG. 6 illustrates an exemplary block diagram of a mobile device according to aspects of the present disclosure. In the exemplary block diagram shown in FIG. 6, the mobile device 104*a* includes a camera 108 for capturing images of a beacon, such as a QR code. The mobile device 104*a* may also include sensors 109, which may be used to make range measurements with which the mobile device 104*a* may determine its position and/or orientation. Examples of sensors that may be used with the mobile device 104*a* include but not limited to: accelerometers, quartz sensors, gyros, micro-electromechanical system (MEMS) sensors used as linear accelerometers, as well as magnetometers.

The mobile device 104*a* may also include a user interface 110 that includes display 112 capable of displaying images. The user interface 110 may also include a keypad 114 or other input device through which the user can input information into the mobile device 104*a*. If desired, the keypad 114 may be obviated by integrating a virtual keypad into the display 112 with a touch sensor. The user interface 110 may also include a microphone 117 and one or more speakers 118, for example, if the mobile platform is a cellular telephone. Of course, mobile device 104*a* may include other components unrelated to the present disclosure.

The mobile device 104*a* further includes a control unit 120 that is connected to and communicates with the camera 108 and sensors 109, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a positioning module 132 configured to determine the position of mobile device 104*a*. The control unit 120 further includes a calibration module 134 configured to calibrate of mobile device 104*a* using multiple calibrated sensor data from beacons in the mobile device 104*a*, as well as using multiple calibrated sensor data received from beacons in access point device 102. The positioning module 132 and calibration module 134 are illustrated separately from processor 122 and/or hardware 128 for clarity, but may be combined and/or implemented in the processor 122 and/or hardware 128 based on instructions in the software 126 and the firmware 130.

Figure 7:
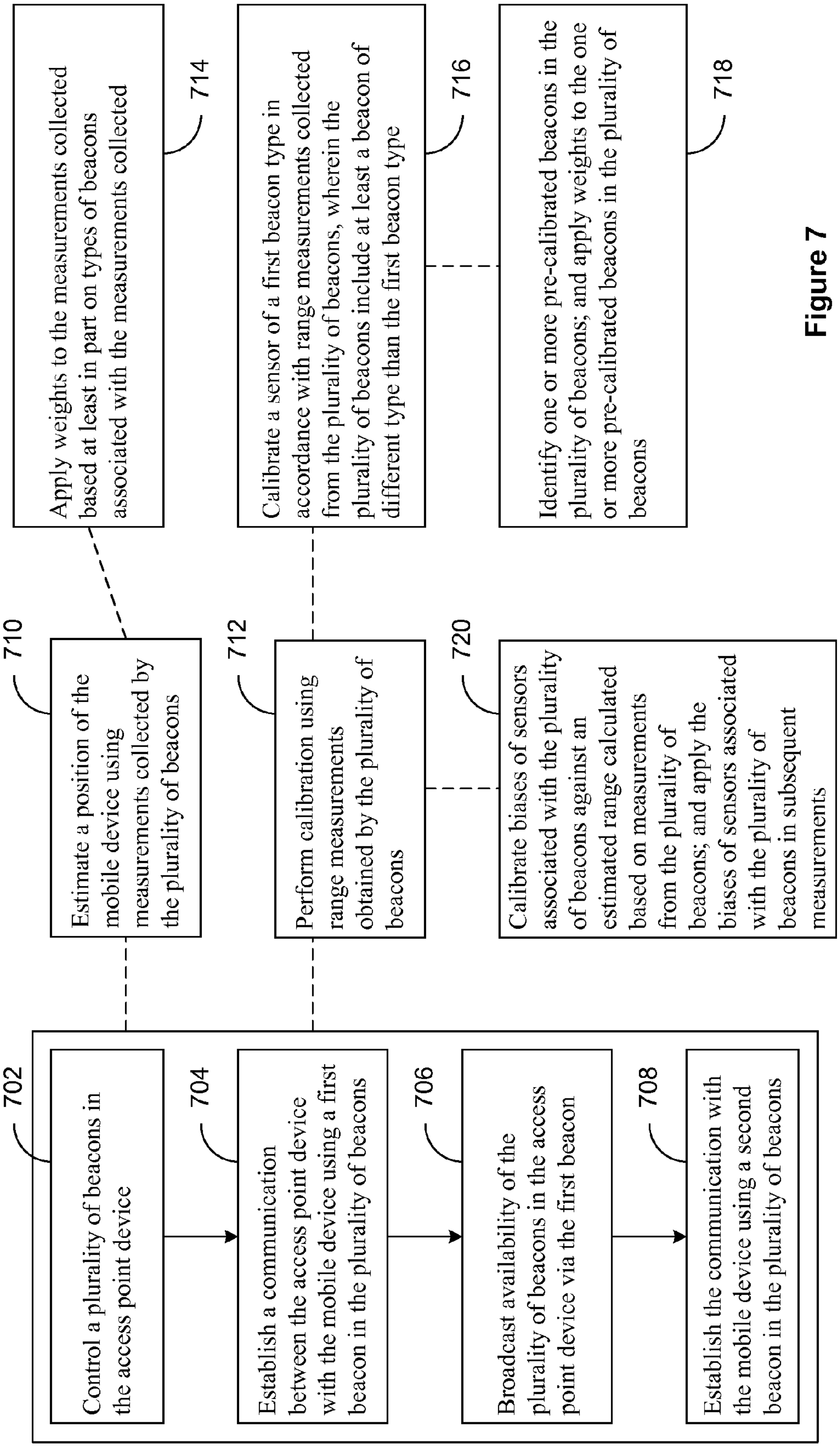
FIG. 7 illustrates an exemplary method of communicating between an access point device and one or more mobile devices according to aspects of the present disclosure.

FIG. 7 illustrates an exemplary method of communicating between an access point device and one or more mobile devices according to aspects of the present disclosure. In block 702, processor 502 may be configured to control a plurality of beacons in the access point device. In block 704, processor 502 may be configured to establish a communication between the access point device with the mobile device using a first beacon in the plurality of beacons. In block 706, processor 502 may be configured to broadcast availability of the plurality of beacons in the access point device via the first beacon. In block 708, processor 502 may be configured to establish the communication with the mobile device using a second beacon in the plurality of beacons.

Note that the plurality of beacons comprises short range beacons, midrange beacons, and long range beacons. The short range beacons comprise two-dimensional bar codes and near field communication devices; the midrange beacons comprise WiFi devices, Bluetooth devices, and Femtocell devices; and the long range beacons comprise cellular devices.

According to aspects of the present disclosure, the methods performed in blocks 702-708 may further include methods performed in block 710, and the methods performed in block 710 may further include methods performed in block 714. In block 710, the processor 502 may be configured to estimate a position of the mobile device using measurements obtained by the plurality of beacons. In block 714, the processor 502 may be configured to apply weights to the measurements obtained based at least in part on types of beacons associated with the measurements obtained.

According to aspects of the present disclosure, the methods performed in blocks 702-708 may further include methods performed in block 712, and the methods performed in block 712 may further include methods performed in blocks 716-720. In block 712, the processor 502 may be configured to perform calibration using range measurements obtained by the plurality of beacons.

In block 716, the processor 502 may be configured to calibrate a sensor of a first beacon type in accordance with range measurements obtained from the plurality of beacons, where the plurality of beacons include at least a beacon of different type than the first beacon type. In block 718, the processor 502 may be configured to identify one or more pre-calibrated beacons in the plurality of beacons, and apply weights to the one or more pre-calibrated beacons in the plurality of beacons.

In block 720, the processor 502 may be configured to calibrate biases of sensors associated with the plurality of beacons against an estimated range calculated based on measurements from the plurality of beacons, and apply the biases of sensors associated with the plurality of beacons in subsequent measurements.

There are various benefits of the present disclosure, including but not limited to: 1) enablement of multi-type hybrid indoor positioning environment using multiple beacons in a single access point device; and 2) enablement of sensor calibration from one beacon type to anther beacon type in the mobile device.

According to aspects of the present disclosure, an access point device may comprise at least one processor, and the at least one processor comprises logic configured to control a plurality of beacons in the access point device, logic configured to establish a communication between the access point device with a mobile device using a first beacon in the plurality of beacons, logic configured to broadcast availability of the plurality of beacons in the access point device via the first beacon, and logic configured to establish the communication with the mobile device using a second beacon in the plurality of beacons. Note that the plurality of beacons comprises short range beacons, midrange beacons, and long range beacons. The short range beacons comprise two-dimensional bar codes and near field communication devices; the midrange beacons comprise WiFi devices, Bluetooth devices, and Femtocell devices; and the long range beacons comprise cellular devices.

The access point device further comprises logic configured to estimate a position of the mobile device using measurements collected by the plurality of beacons. The logic configured to estimate the position of the mobile device comprises logic configured to apply weights to the measurements collected based at least in part on types of beacons associated with the measurements collected.

The access point device further comprises logic configured to perform calibration using range measurements obtained by the plurality of beacons. The logic configured to perform the calibration comprises logic configured to calibrate a sensor of a first beacon type in accordance with the range measurements obtained from the plurality of beacons, where the plurality of beacons include at least a beacon of different type than the first beacon type. The logic configured to calibrate the sensor of the first beacon type comprises logic configured to identify one or more pre-calibrated beacons in the plurality of beacons, and logic configured to applying weights to the one or more pre-calibrated beacons in the plurality of beacons.

The logic configured to perform the calibration further comprises logic configured to calibrate biases of sensors associated with the plurality of beacons against an estimated range calculated based on measurements from the plurality of beacons, and logic configured to apply the biases of sensors associated with the plurality of beacons in subsequent measurements.

Note that at least the following three paragraphs, FIGS. 1-7 and their corresponding descriptions provide means for controlling a plurality of beacons in the access point device; means for establishing a communication between the access point device with the mobile device using a first beacon in the plurality of beacons; means for broadcasting availability of the plurality of beacons in the access point device via the first beacon; means for establishing the communication with the mobile device using a second beacon in the plurality of beacons; means for calibrating a sensor of a first beacon type in accordance with range measurements obtained from the plurality of beacons, where the plurality of beacons include at least a beacon of different type than the first beacon type; means for identifying one or more pre-calibrated beacons in the plurality of beacons; means for applying weights to the one or more pre-calibrated beacons in the plurality of beacons; means for calibrating biases of sensors associated with the plurality of beacons against an estimated range calculated based on measurements from the plurality of beacons; and means for applying the biases of sensors associated with the plurality of beacons in subsequent measurements.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of communicating between a mobile device and an access point device, comprising:
- controlling a plurality of beacons in the access point device;
- establishing a communication between the access point device with the mobile device using a first beacon in the plurality of beacons;
- broadcasting availability of the plurality of beacons in the access point device via the first beacon;
- establishing the communication with the mobile device using a second beacon in the plurality of beacons; and
- performing calibration using range measurements obtained by the plurality of beacons, comprising calibrating a sensor of a first beacon type in accordance with the range measurements obtained from the plurality of beacons, wherein the plurality of beacons include at least a beacon of different type than the first beacon type.

2. The method of claim 1, wherein the plurality of beacons comprises:
- short range beacons;
- midrange beacons; and
- long range beacons.

3. The method of claim 2, wherein the short range beacons comprise two-dimensional bar codes and near field communication devices; wherein the midrange beacons comprise WiFi devices, Bluetooth devices, and Femtocell devices; and wherein the long range beacons comprise cellular devices.

4. The method of claim 1, further comprising:
- estimating a position of the mobile device using measurements collected by the plurality of beacons.

5. The method of claim 4, wherein the estimating the position of the mobile device comprises:
- applying weights to the measurements collected based at least in part on types of beacons associated with the measurements collected.

6. The method of claim 1, wherein the calibrating the sensor of the first beacon type comprises:
- identifying one or more pre-calibrated beacons in the plurality of beacons; and
- applying weights to the one or more pre-calibrated beacons in the plurality of beacons.

7. The method of claim 1, wherein the performing calibration further comprises:
- calibrating biases of sensors associated with the plurality of beacons against an estimated range calculated based on measurements from the plurality of beacons; and
- applying the biases of sensors associated with the plurality of beacons in subsequent measurements.

8. An access point device, comprises:
- at least one processor, wherein the at least one processor comprises
- logic configured to control a plurality of beacons in the access point device;
- logic configured to establish a communication between the access point device with a mobile device using a first beacon in the plurality of beacons;
- logic configured to broadcast availability of the plurality of beacons in the access point device via the first beacon;
- logic configured to establish the communication with the mobile device using a second beacon in the plurality of beacons; and
- logic configured to perform calibration using range measurements obtained by the plurality of beacons, comprising logic configured to calibrate a sensor of a first beacon type in accordance with the range measurements obtained from the plurality of beacons, wherein the plurality of beacons include at least a beacon of different type than the first beacon type.

9. The access point device of claim 8, wherein the plurality of beacons comprises:

short range beacons;

midrange beacons; and long range beacons.

10. The access point device of claim 9, wherein the short range beacons comprise two-dimensional bar codes and near field communication devices; wherein the midrange beacons comprise WiFi devices, Bluetooth devices, and Femtocell devices; and wherein the long range beacons comprise cellular devices.

11. The access point device of claim 8, further comprises:

logic configured to estimate a position of the mobile device using measurements collected by the plurality of beacons.

12. The access point device of claim 11, wherein the logic configured to estimate the position of the mobile device comprises:

logic configured to apply weights to the measurements collected based at least in part on types of beacons associated with the measurements collected.

13. The access point device of claim 8, wherein the logic configured to calibrate the sensor of the first beacon type comprises:

logic configured to identify one or more pre-calibrated beacons in the plurality of beacons; and logic configured to applying weights to the one or more pre-calibrated beacons in the plurality of beacons.

14. The access point device of claim 8, wherein the logic configured to perform the calibration further comprises:

logic configured to calibrate biases of sensors associated with the plurality of beacons against an estimated range calculated based on measurements from the plurality of beacons; and logic configured to apply the biases of sensors associated with the plurality of beacons in subsequent measurements.

15. A computer program product comprising a non-transitory medium storing computer programs for execution by one or more processors, the computer program product comprising:

code for controlling a plurality of beacons in an access point device;

code for establishing a communication between the access point device with a mobile device using a first beacon in the plurality of beacons;

code for broadcasting availability of the plurality of beacons in the access point device via the first beacon;

code for establishing the communication with the mobile device using a second beacon in the plurality of beacons; and code for performing calibration using range measurements obtained by the plurality of beacons, comprising code for calibrating a sensor of a first beacon type in accordance with the range measurements obtained from the plurality of beacons, wherein the plurality of beacons include at least a beacon of different type than the first beacon type.

16. The computer program product of claim 15, wherein the plurality of beacons comprises:

short range beacons;

midrange beacons; and long range beacons.

17. The computer program product of claim 16, wherein the short range beacons comprise two-dimensional bar codes and near field communication devices; wherein the midrange beacons comprise WiFi devices, Bluetooth devices, and Femtocell devices; and wherein the long range beacons comprise cellular devices.

18. The computer program product of claim 15, further comprising:

code for estimating a position of the mobile device using measurements collected by the plurality of beacons.

19. The computer program product of claim 18, wherein the code for estimating the position of the mobile device comprises:

code for applying weights to the measurements collected based at least in part on types of beacons associated with the measurements collected.

20. The computer program product of claim 15, wherein the code for calibrating the sensor of the first beacon type comprises:

code for identifying one or more pre-calibrated beacons in the plurality of beacons; and code for applying weights to the one or more pre-calibrated beacons in the plurality of beacons.

21. The computer program product of claim 15, wherein the code for performing calibration further comprises:

code for calibrating biases of sensors associated with the plurality of beacons against an estimated range calculated based on measurements from the plurality of beacons; and code for applying the biases of sensors associated with the plurality of beacons in subsequent measurements.

22. An access point device, comprises:

means for controlling a plurality of beacons in the access point device;

means for establishing a communication between the access point device with a mobile device using a first beacon in the plurality of beacons;

means for broadcasting availability of the plurality of beacons in the access point device via the first beacon;

means for establishing the communication with the mobile device using a second beacon in the plurality of beacons; and means for calibrating a sensor of a first beacon type in accordance with the range measurements obtained from the plurality of beacons, wherein the plurality of beacons include at least a beacon of different type than the first beacon type.

23. The access point device of claim 22, wherein the means for calibrating the sensor of the first beacon type comprises:

means for identifying one or more pre-calibrated beacons in the plurality of beacons; and means for applying weights to the one or more pre-calibrated beacons in the plurality of beacons.

24. The access point device of claim 22, further comprises:

means for calibrating biases of sensors associated with the plurality of beacons against an estimated range calculated based on measurements from the plurality of beacons; and means for applying the biases of sensors associated with the plurality of beacons in subsequent measurements.

25. A mobile device, comprises:

at least one processor, wherein the at least one processor comprises logic configured to control a plurality of beacons in the mobile device;

logic configured to establish a communication between an access point device with the mobile device using a first beacon in the plurality of beacons;

logic configured to receive a broadcast availability of a set of beacons in the access point device via the first beacon;

logic configured to establish the communication with the access point device using a second beacon in the plurality of beacons; and logic configured to calibrate a sensor of a first beacon type in accordance with the range measurements obtained from the plurality of beacons, wherein the plurality of beacons include at least a beacon of different type than the first beacon type.

26. The mobile device of claim 25, further comprising:

logic configured to estimate a position of the mobile device using measurements collected by the plurality of beacons.

27. The mobile device of claim 26, wherein the logic configured to estimate the position of the mobile device comprises:

logic configured to apply weights to the measurements collected based at least in part on types of beacons associated with the measurements collected.

28. The mobile device of claim 25, wherein the logic configured to calibrate the sensor of the first beacon type comprises:

logic configured to identify one or more pre-calibrated beacons in the plurality of beacons; and logic configured to apply weights to the one or more pre-calibrated beacons in the plurality of beacons.

29. The mobile device of claim 25, further comprises:

logic configured to calibrate biases of sensors associated with the plurality of beacons against an estimated range calculated based on measurements from the plurality of beacons; and logic configured to apply the biases of sensors associated with the plurality of beacons in subsequent measurements.

* * * * *